(12) United States Patent
Salmo et al.

(10) Patent No.: US 7,404,572 B2
(45) Date of Patent: Jul. 29, 2008

(54) CURTAIN AIR BAG

(75) Inventors: Shakir M. Salmo, Sterling Heights, MI (US); Pongdet P. Wipasuramonton, Rochester, MI (US); Mark Otto Olson, Farmington Hills, MI (US); Jovica J. Jakovski, Warren, MI (US); Charles Stanley Emil Walczak, Warren, MI (US)

(73) Assignee: Key Safety Systems, Inc, Sterling Heights, MI (US)

( * ) Notice: Subject to any disclaimer, the term of this patent is extended or adjusted under 35 U.S.C. 154(b) by 688 days.

(21) Appl. No.: 10/640,233

(22) Filed: Aug. 13, 2003

(65) Prior Publication Data
US 2004/0188987 A1 Sep. 30, 2004

Related U.S. Application Data

(60) Provisional application No. 60/457,425, filed on Mar. 24, 2003.

(51) Int. Cl.
*B60R 21/16* (2006.01)
(52) U.S. Cl. .................. 280/729; 280/743.1; 280/743.2
(58) Field of Classification Search ................. 280/729, 280/730.2, 739, 743.1, 743.2
See application file for complete search history.

(56) References Cited

U.S. PATENT DOCUMENTS

| | | | | |
|---|---|---|---|---|
| 5,788,270 A | * | 8/1998 | Håland et al. | 280/729 |
| 6,199,898 B1 | * | 3/2001 | Masuda et al. | 280/730.2 |
| 6,270,113 B1 | * | 8/2001 | Wipasuramonton et al. | 280/730.2 |
| 6,276,712 B1 | * | 8/2001 | Welch et al. | 280/730.2 |
| 6,334,625 B1 | * | 1/2002 | Pausch et al. | 280/729 |
| 6,450,529 B1 | | 9/2002 | Tobian et al. | |
| 6,502,857 B2 | * | 1/2003 | Nakanishi et al. | 280/740 |
| 6,705,636 B2 | * | 3/2004 | Takahara | 280/728.2 |
| 6,811,184 B2 | * | 11/2004 | Ikeda et al. | 280/742 |
| 6,877,771 B2 | * | 4/2005 | Weber | 280/742 |
| 7,147,244 B2 | * | 12/2006 | Takahara | 280/730.2 |
| 2003/0218324 A1 | * | 11/2003 | Ju et al. | 280/743.1 |

FOREIGN PATENT DOCUMENTS

| | | |
|---|---|---|
| DE | 201 05 734 U | 8/2001 |
| DE | 202 16 339 U | 2/2003 |
| EP | 1 364 839 A | 11/2003 |
| EP | 1 418 096 A | 5/2004 |
| GB | 2 314 300 A | 12/1997 |
| JP | 11 115667 A | 4/1999 |
| WO | WO 01/45988 | 6/2001 |
| WO | WO 02/051671 A2 | 7/2002 |
| WO | WO 02/079008 A1 | 10/2002 |

* cited by examiner

*Primary Examiner*—Toan To
(74) *Attorney, Agent, or Firm*—Markell Seitzman

(57) ABSTRACT

A new and useful curtain air bag having an inflatable fluid cushion with inflatable fluid sections, and a flexible bladder located within the inflatable cushion. A fluid inlet conduit is configured to direct inflation fluid into the bladder from an inflation fluid source. The bladder is configured to redirect, diffuse and distribute the inflation fluid to the inflatable sections of the inflatable cushion, to inflate the portions of the inflatable cushion in a predetermined manner. Another type of curtain air bag assembly includes an inflatable cushion with a pair of similar volume inflatable sections, on opposite sides of an inlet conduit. In each type of air bag assembly, the fluid can be redirected by the bladder or the inflatable cushion, or by a transverse fluid conduit disposed in the bladder or the inflatable cushion.

6 Claims, 9 Drawing Sheets

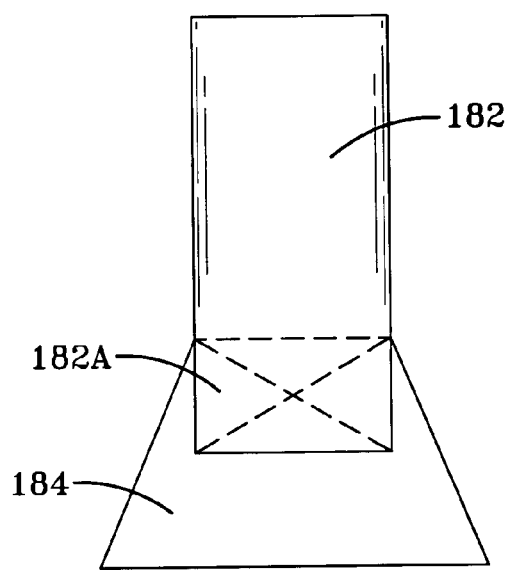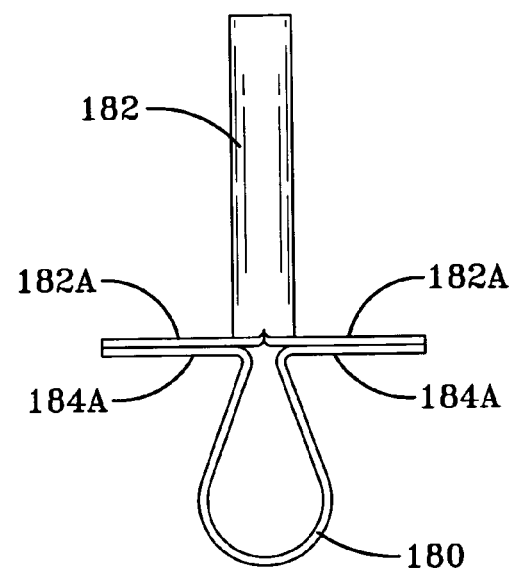
FIG-13A  FIG-13B
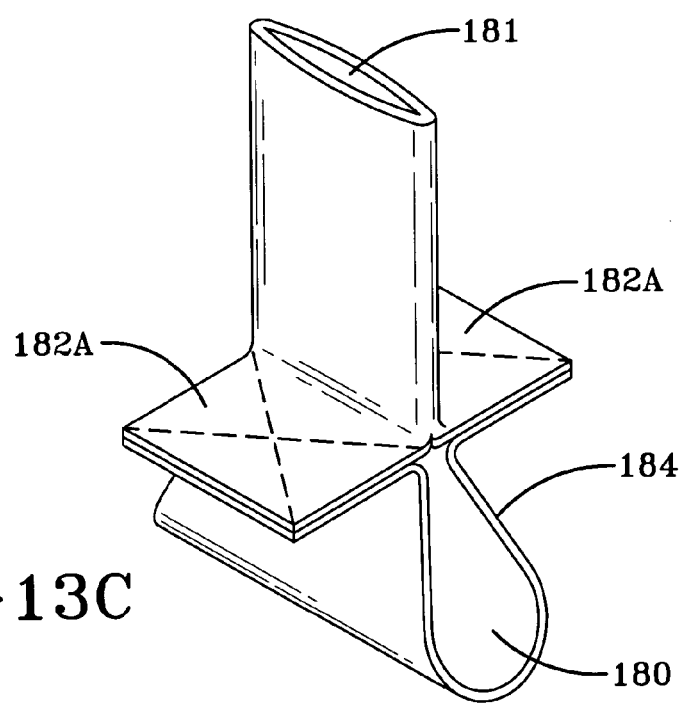
FIG-13C

CURTAIN AIR BAG

This application is related to and claims priority from provisional application Ser. No. 60/457,425, filed Mar. 24, 2003.

BACKGROUND AND SUMMARY OF THE INVENTION

The present invention relates to a side impact air bag and more particularly to a side curtain air bag.

A side curtain air bag is typically located inside a vehicle headliner. At the onset of a side collision or a vehicle rollover, the curtain air bag is deployed and inflated along the side of the vehicle, to protect the vehicle occupant's head and upper torso against impact with the side of the vehicle.

A known way of constructing a side curtain air bag is to provide a pair of panels that are sewn together to form an inflatable cushion. Alternatively, rather than using a pair of panels a main panel that is folded over a centerline is used to provide the panel or panel parts that are sewn together to realize the inflatable cushion. The manner in which the panels are sewn together configures the inflatable cushion into inflatable sections that are inflated to protect the occupant's head and upper torso during a side impact or a vehicle rollover. It is also known to inflate the inflatable sections by a cylindrical passage located in the inflatable cushion, and which distributes inflation fluid from a source along the length of the cushion and into the inflatable sections of the cushion.

The present invention provides a new and useful configuration for a curtain air bag and particularly a new and useful structure for controlling the flow of inflation fluid in a side curtain air bag.

In one type of curtain air bag configured according to the present invention, a curtain air bag has a flexible bladder within an inflatable cushion. A flexible fluid inlet conduit is configured to direct inflation fluid into the bladder. The bladder is configured to redirect, diffuse and distribute the inflation fluid. Fluid vents are configured to communicate the inflation fluid from the bladder into the inflatable sections of the inflatable cushion, to inflate these sections in a predetermined manner.

In another type of curtain air bag configured according to the present invention, the curtain air bag comprises an inflatable cushion with two similar size inflatable sections, on opposite sides of a fluid inlet conduit. The inflation fluid is redirected, diffused and distributed to the two inflatable sections in accordance with the principles of the present invention, but this type of curtain air bag may not require a bladder.

The present invention is particularly useful with an inflation fluid source located between the front and rear ends of the inflatable cushion, and whose inflation fluid is directed toward both the front and rear ends of the inflatable cushion. This inflation fluid source is sometimes referred to as a "mid-mount" inflation fluid source. However, it will be recognized by those in the art that the term "mid-mount" is not intended to define a precise location for the inflation fluid source, but rather is used in the sense that fluid from such a source is directed toward both the front and the rear ends of the inflatable cushion. According to the present invention, fluid from a mid-mount inflation fluid source is redirected, diffused and distributed, to inflate the inflatable sections of the curtain air bag in a predetermined manner.

In addition, the curtain air bag assembly of the present invention is designed in a manner believed to provide a cost-effective way of producing the curtain air bag assembly.

Further features of the invention will be apparent from the following detailed description and the accompanying drawings.

BRIEF DESCRIPTION OF THE DRAWINGS

FIGS. 13A-13C illustrate still another structure for redirecting and diffusing inflation fluid in a curtain air bag according to the principles of the present invention;

DETAILED DESCRIPTION

As described above, the present invention relates to a curtain air bag with a new and useful structure for redirecting, diffusing and distributing inflation fluid directed into the curtain air bag. The principles of the present invention are described below in connection with two types of side curtain air bags, each of which includes a mid-mount inflation fluid source for a side curtain air bag. However, from that description the manner in which the principles of the present invention can be applied to other types of curtain air bags designed for use with mid-mount inflation fluid sources will be apparent to those in the art.

Figure 1:
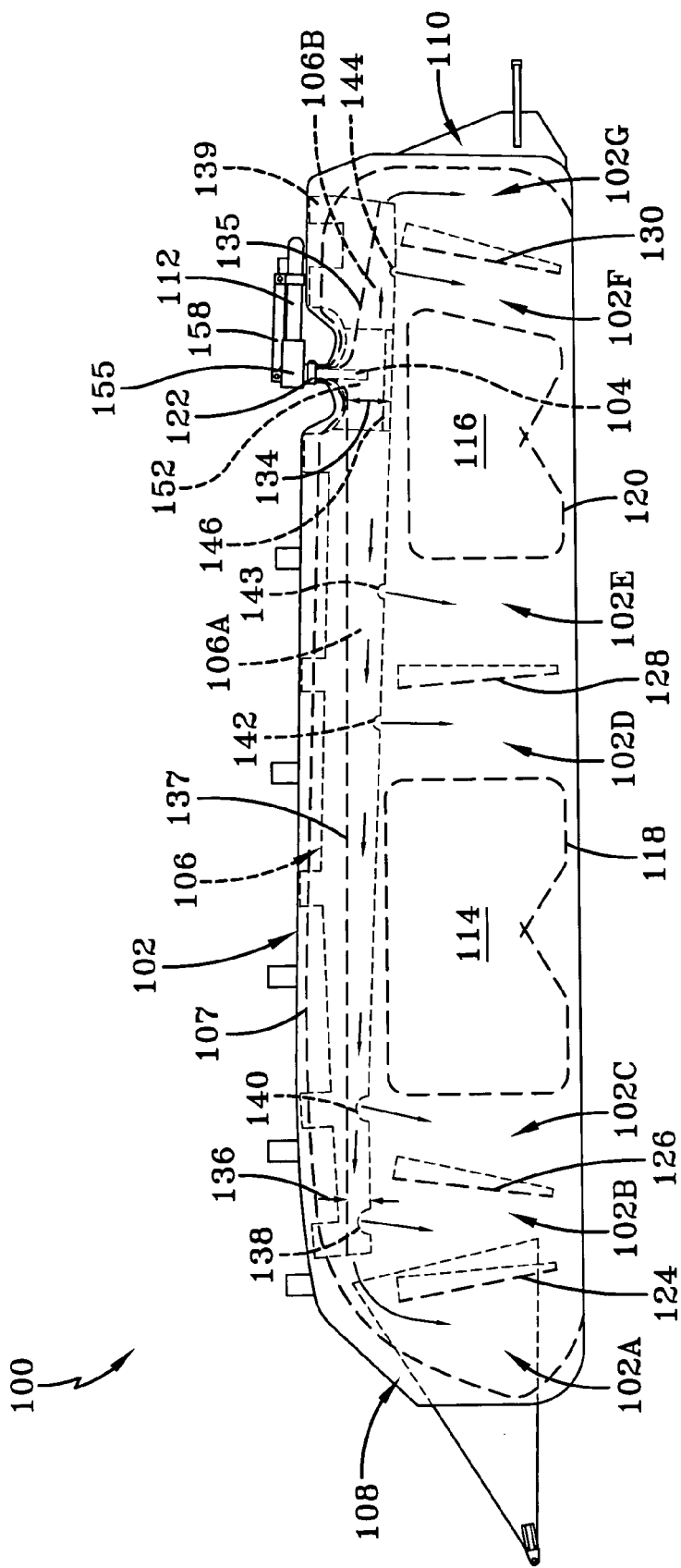
FIG. 1 is a schematic side view of one type of side curtain air bag assembly, including a curtain air bag according to the principles of the present invention.

FIG. 1 is a side view of one type of curtain air bag assembly 100 with a side curtain air bag that is configured to distribute inflation fluid according to the principles of the present invention. The side curtain air bag includes an inflatable cushion or air bag 102 that is elongated in shape and receives inflation fluid through a mid-mount located inlet conduit 104. In a vehicle air bag assembly, the inflation fluid is generally an inert gas. The inflatable cushion 102 includes a plurality of inflatable sections 102A-G, which are described in more detail below. A bladder 106 is located within the inflatable cushion, below a top perimeter seam 107 of the inflatable cushion 102, and is configured to redirect, diffuse and distribute inflation fluid from the inlet conduit to the inflatable cushion sections 102A-G, in accordance with the principles of the present invention.

As is known in the art this type of side curtain air bag is mounted to the roof rail of a vehicle and spans the distance between at least two pillars of the vehicle. The front and rear sides 108, 110, respectively, of the inflatable cushion 102, are sized to extend between the A-pillar and the C or D-pillar of the vehicle. The inlet conduit 104 receives inflation fluid from an inflation fluid source 112 (preferably a gas generator) and directs the inflation fluid into the bladder 106. The bladder 106 redirects, diffuses and distributes the inflation fluid to the inflatable sections 102A-102G of the cushion 102, in accordance with the principles of the present invention.

The cushion 102 can be formed in a number of ways including being woven or knitted as an integral unit, e.g. by a Jacquard loom or by sewing one or more panels of material together. The cushion 102 is preferably formed from silicon, urethane or neoprene coated, woven air bag fabric. The cushion 102 includes the inflatable sections 102A-G, and uninflated regions 114, 116 (sometimes referred to as inactive zones). If the cushion 102 is formed by sewing one or more panels together, peripheral seams 118, 120, which are sewn seams, bind the uninflated regions 114, 116, respectively. If the cushion 102 is formed by ultra-sonic bonding one or more panels together, the peripheral seams 118, 120 that bound the uninflated regions 114, 116, respectively, are bonded or joined seams. If the cushion is woven, the cushion includes opposed panel-like portions, and the peripheral seams 118, 120 that bound the uninflated regions 114, 116, are formed by inter-weaving the weft and warp fibers that form the opposed panel-like portions.

Figure 5:
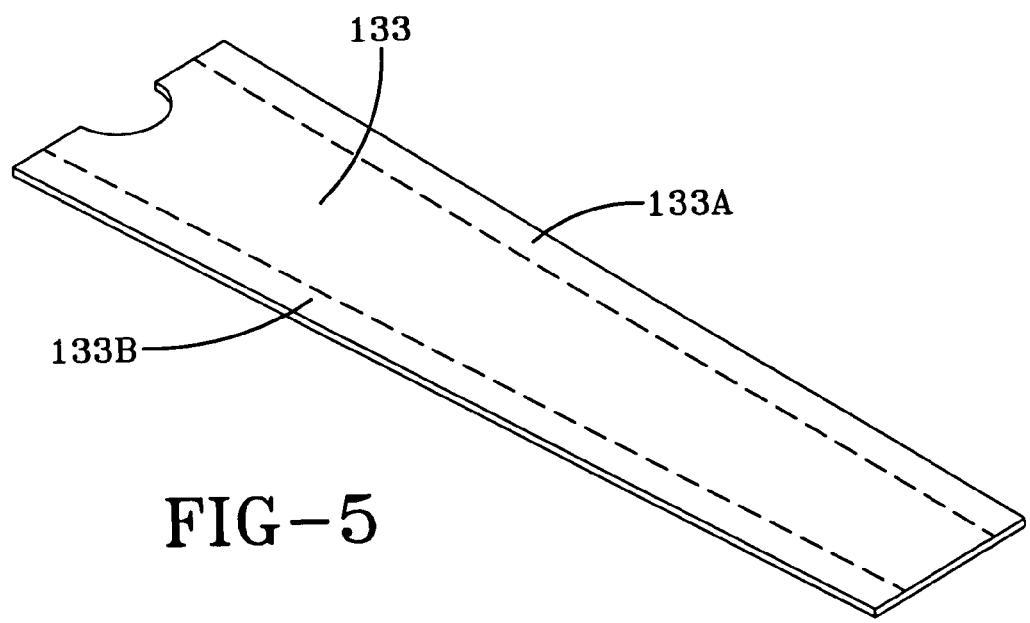
FIG. 5 is an illustration of a segment of material that can be used to form a 3D tether in a side curtain air bag of the type shown in FIGS. 1-4.

Certain of the inflatable sections 102A-G are also bounded by internal tethers 124, 126, 128, and 130. The tethers can be formed, e.g. by narrow sewn (bonded) lines or seams, or by narrowed woven regions of the fabric, which form the opposed panel like portions of the inflatable cushion. For example, some or all of the panels (or the panel-like portions) can be joined directly to each other (which is generally referred to as a 2D tether) or joined to each other via a fabric segment (referred to as a 3D tether) to separate the inflatable cushion into several of the inflatable sections 102A-G. FIG. 5 illustrates a segment of flexible air bag material 133 that can be used to form a 3D tether. The segment of material has border portions 133A, 133B that are joined to respective panels of the inflatable cushion 102. A primary purpose of the 3D tether is to permit the respective panels of the inflatable cushion to become sufficiently separated from one another during inflation. An additional purpose of a 3D tether is to also control the volume of the cushion. In the illustrated embodiment of FIG. 1, the tethers 124, 126, 128, and 130 are all 3D tethers. Thus, the interior volume of the cushion 102 is separated into the inflatable sections 102A-G. The locations and pattern of the inflatable sections, the tethers, and the inactive zones are designed to provide (a) maximum cushioning (via the inflatable sections) at the most strategic locations to cushion a vehicle occupant's head during a side impact or rollover, (b) less cushioning at less strategic locations (e.g. the 2D and 3D tether locations) and (c) even less cushioning in the inactive zones. The overall configuration of the cushion 102 is generally designed to provide priority of cushioning effect at the locations where it can do the most good, and in a manner by which such cushioning effect can be provided within an acceptable time frame from the onset of a collision or rollover.

Figure 2:
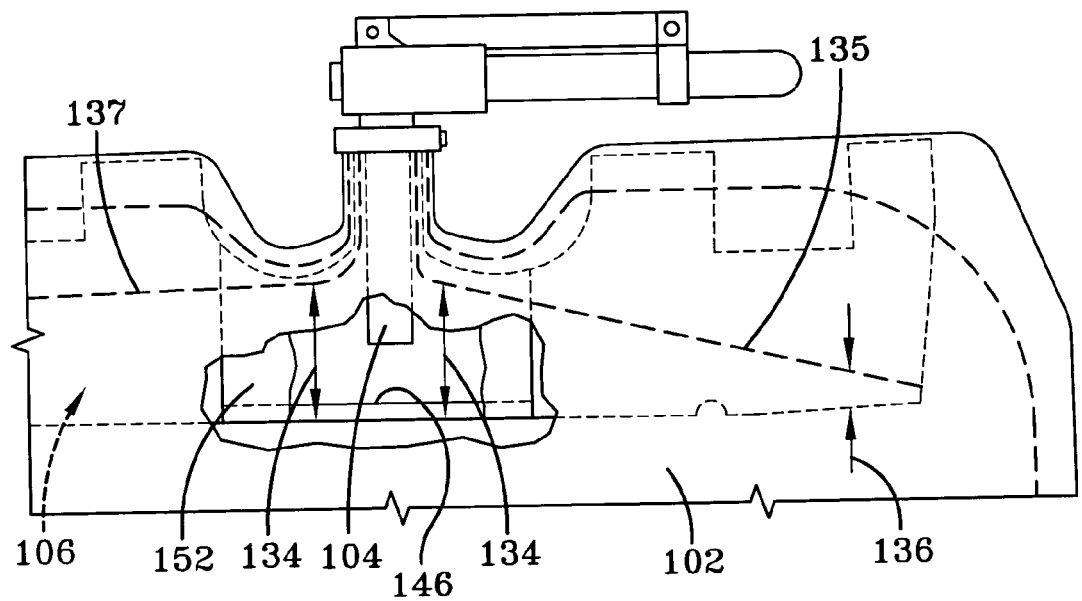
FIG. 2 is a fragmentary illustration, with portions cut away, of part of a side curtain air bag assembly similar to the type shown in FIG. 1, and showing part of an inflatable bladder of a side curtain air bag according to the principles of the present invention.
Figure 6:
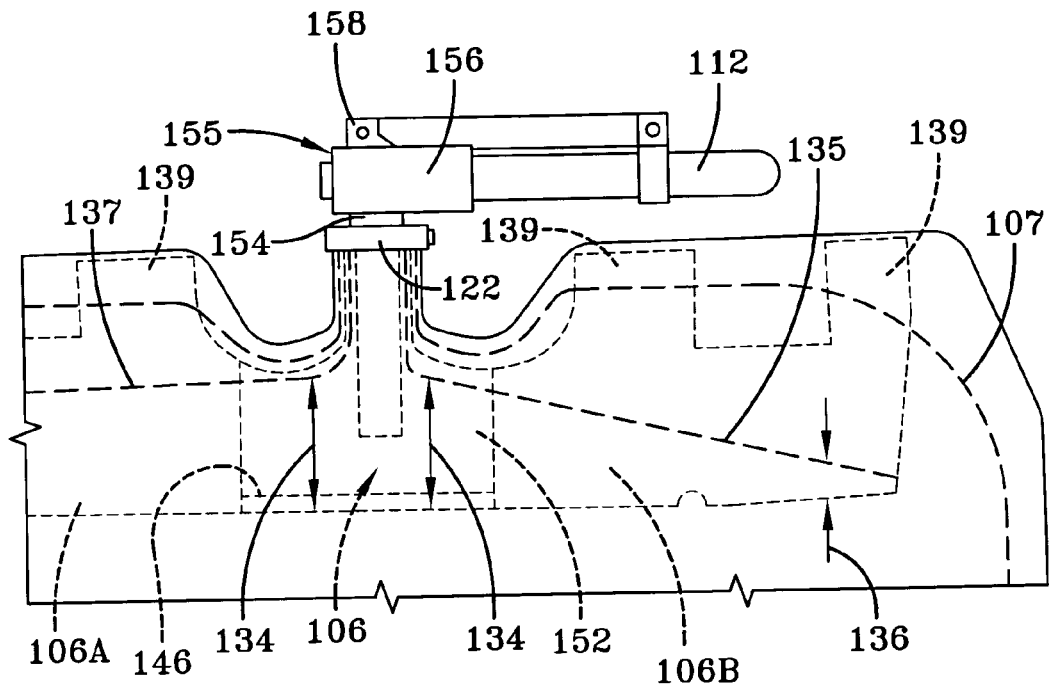
FIG. 6 is a fragmentary illustration of a side curtain air bag assembly of the type shown in FIG. 1, particularly showing the inflation fluid source connected to the side curtain air bag.
Figure 7:
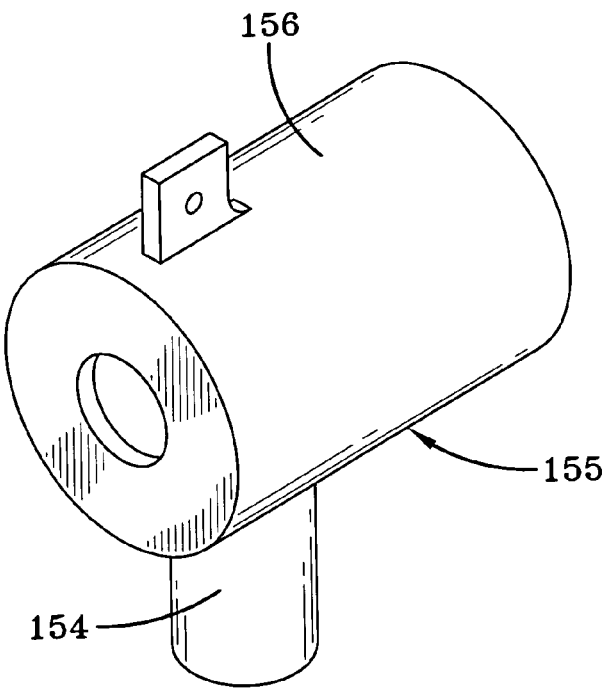
FIG. 7 is a perspective view of the structure forming a fluid manifold and nozzle device for a side curtain air bag according to the present invention.

The bladder 106 is formed of flexible material (e.g. silicon coated airbag fabric) and includes tapering sections 106A, 106B extending in opposite directions away from the inlet conduit 104, and transverse to the inlet conduit 104. In the example of FIG. 1, the tapering section 106A is relatively long, in comparison to the tapering section 106B. Each tapering section can comprise a panel of the air bag material that is folded into the configuration of the tapering section, or the tapering section can be integrally woven into the air bag fabric. Alternatively, and as illustrated in FIGS. 1, 2 and 6, each tapering section 106A, 106B can be formed by a section of material that may have an original shape that is other than the final tapering shape, but which is formed into a tapering section with a predetermined tapering profile, by appropriate sew lines in the section of material. As shown in FIGS. 1, 2 and 6, the sew line 135 defines a boundary of the shorter tapering section 106B, and the sew line 137 defines a boundary of the longer tapering section 106A. The material forming the tapering sections 106A, 106B should be flexible enough to be conveniently folded when the air bag is being stored and conveniently inflated without tending to balloon.

Each of the tapering sections 106A, 106B has a relatively wide part 134 near the inlet conduit 104, and a narrower part 136 remote from the inlet conduit. The narrow ends of the tapering sections can be configured to form fluid outlets for the bladder, if desired. Whether such fluid outlets are provided depends on the requirements of the particular inflatable cushion; specifically how much and how quickly inflation fluid needs to be directed into the inflatable sections 102A, 102G at the front and rear ends of the particular inflatable cushion.

Each of the tapering sections 106A, 106B of the bladder may include a plurality of vent holes positioned to communicate inflation fluid from the bladder to the inflatable sections of the cushion 102. In the embodiment of FIG. 1, vent holes 138, 140, 142, and 143 are formed in the tapering section 106A; vent hole 144 is formed in the tapering section 106B. Also, the desired speed and sequence with which the inflatable sections 102A-G are intended to be inflated (particularly the inflatable sections 102A and 102G at the ends of the cushion) determine whether the narrow ends of the tapering sections are formed with fluid outlet passages. The vent holes in a tapering section of the bladder can be preformed in the material that is used to form the tapering section, or can be formed after the tapering section is sewn into the air bag. The positioning and diameter of each vent hole will depend on the size and location of the inflatable sections 102A-G of the cushion 102 and the manner in which the bladder is designed to distribute inflation gas to the inflatable sections of the cushion 102. The vent holes can be reinforced, by techniques known to those in the art, if necessary or desirable.

Figure 8:
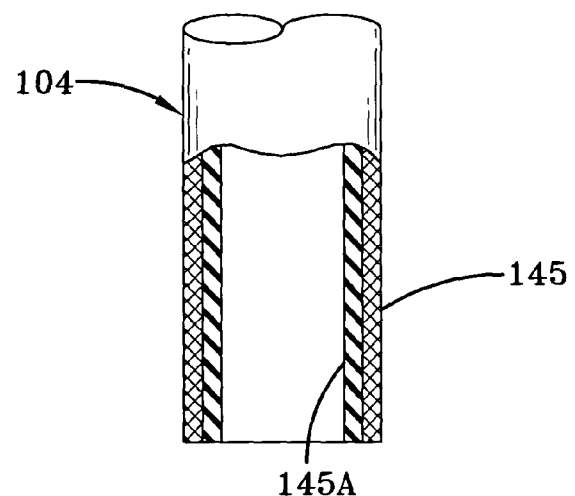
FIG. 8 is a fragmentary, schematic cross section of a portion of an inlet fluid conduit for a side curtain air bag, according to the principles of the present invention.
Figure 9:
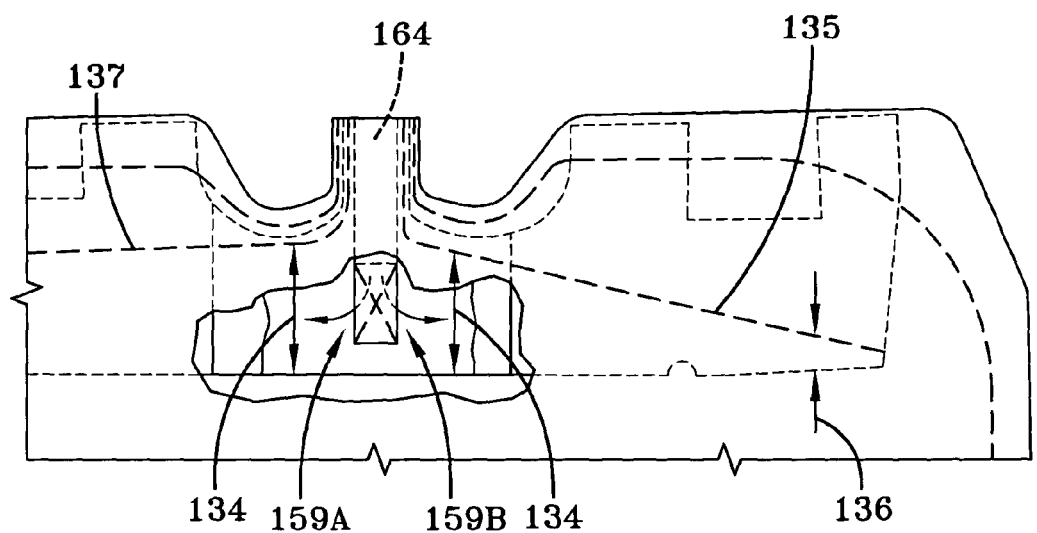
FIG. 9 schematically illustrates one alternative structure for redirecting and diffusing inflation fluid in a side curtain air bag, according to the principles of the present invention.

Referring to FIG. 1, the inlet conduit 104 is located generally between the tapering sections 106A, 106B of the bladder. The tapering sections 106A, 106B extend in opposite directions from and transverse to the inlet conduit 104. As schematically illustrated in FIG. 8, the inlet conduit 104 can be formed as a thin-walled, flexible fabric or plastic tube 145. When formed of fabric, the inlet conduit can have a woven or braided exterior and an optional interior, rubberized lining 145A.

The bladder 106 includes a reaction surface 146 in the path of inflation fluid directed from the inlet conduit 104 into the bladder. With some inflation fluid sources, the inflation fluid tends to be relatively hot when it enters the inlet conduit 104. With other inflation fluid sources, the inflation fluid is relatively cool. The inlet conduit can be reinforced, or provided with heat shielding, as needed or desirable, to withstand the heat and pressures of the inflation fluid. The reaction surface 146 is particularly useful with relatively hot inflation fluid, and is configured to prevent the relatively hot inflation fluid from penetrating through the heat shield 152 (described below), the bladder 106 and ultimately the main panel(s) of the cushion, which would cause the inflation fluid to leak out of the cushion, and would prevent the cushion from providing adequate protection.

The other purpose of the reaction surface 146 is to redirect the inflation fluid into the wide parts 134 of each of the tapering sections 106A, 106B of the bladder. That inflation fluid diffuses into and inflates the tapering sections 106A, 106B of the bladder. Thus, the inflation fluid diffuses into and flows in opposite directions in the bladder (i.e. toward the front and rear ends 108, 110 of the cushion 102), so that inflation fluid is distributed along the cushion 102 by the tapering sections 106A, 106B of the bladder.

Figure 3:
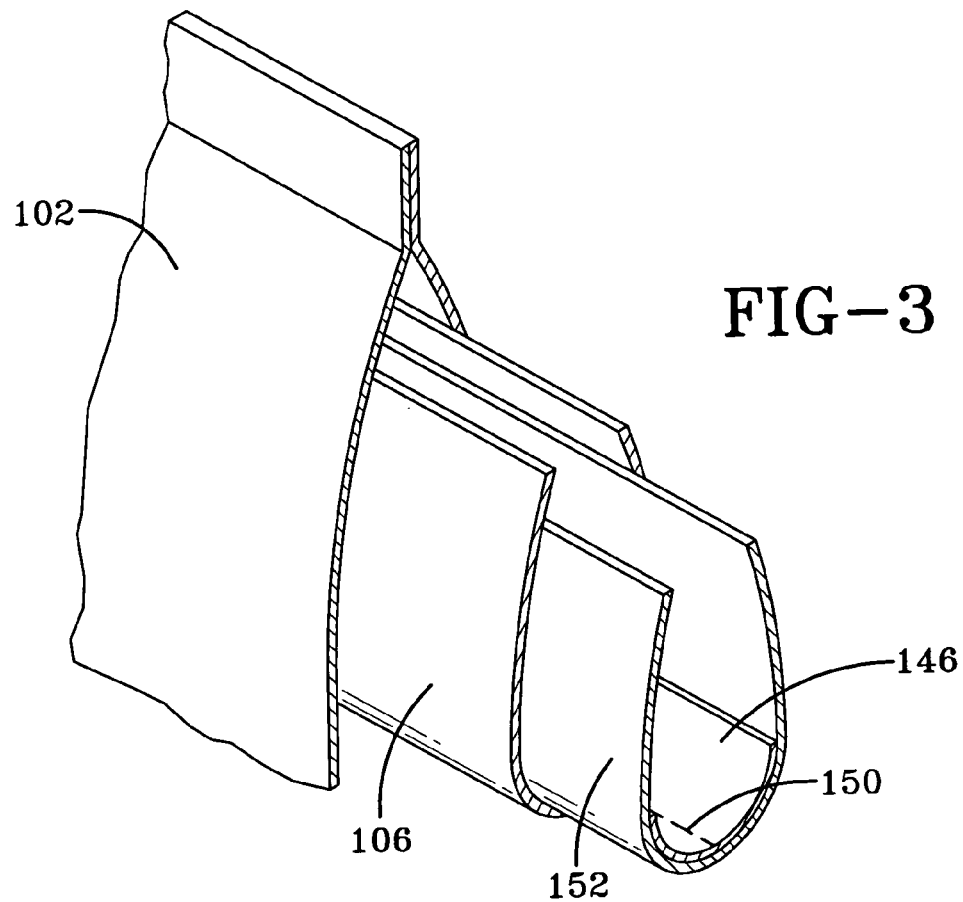
FIG. 3 is another fragmentary illustration, with portions cut away, of a side curtain air bag assembly similar to the type shown in FIG. 1, and showing another view of an inflatable bladder of a side curtain air bag according to the principles of the present invention.
Figure 4:
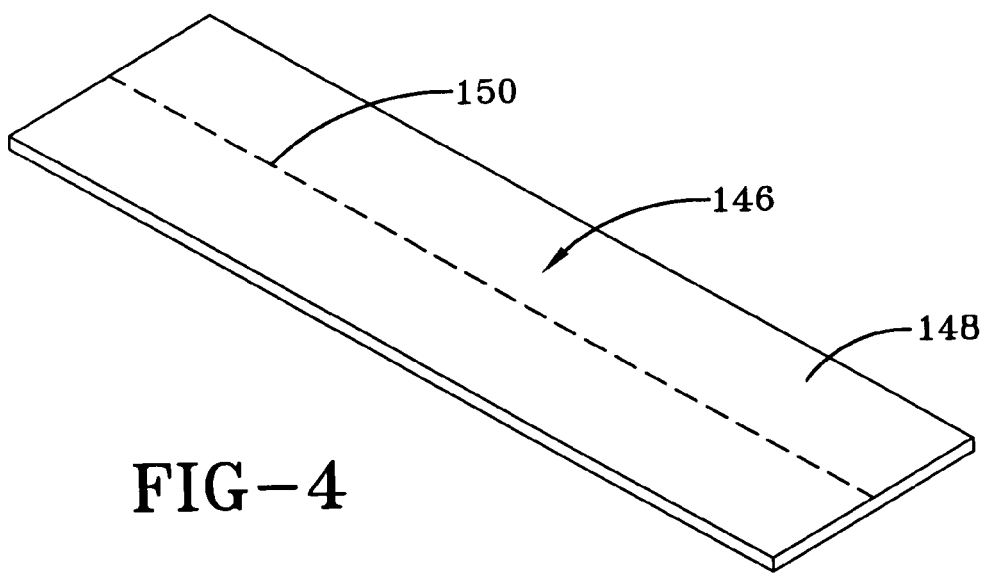
FIG. 4 is an illustration of a segment of material forming a reaction surface for a side curtain air bag of the type shown in FIGS. 1-4.

The reaction surface 146 of the bladder is preferably formed of a section of wide polyester webbing 148 that has a central fold line 150 (see FIG. 4). When the reaction surface 146 is incorporated into the bladder, the central fold line 150 is common to (i.e. immediately adjacent to) fold lines of the bladder and the heat shield 152 (see FIG. 3). The central fold line 150 is also located directly in the path of inflation fluid directed through the inlet conduit 104, so that the reaction surface 146 rapidly redirects that inflation fluid to the wide portions 134 of the bladder. The volumes of the tapering sections 106A, 106B of the bladder are dimensioned to enable the redirected inflation fluid rapidly to be diffused and distributed along the cushion.

The heat shield 152, preferably formed by a segment of flexible material (e.g. silicon coated air bag fabric), is attached to the inside of the bladder, generally adjacent the inlet conduit 104, and has a fold line which is common to the central fold line 150 (see FIG. 3). The heat shield 152 provides additional protection for the bladder, at locations where the inflation fluid entering the bladder is generally the hottest. The heat shield 152 may not extend the full extent of the tapering sections 106A, 106B of the bladder, however, the heat shield can be extended to provide such coverage and protection along the entire length of the bladder, if necessary or desirable. Prior to sewing the bladder closed, the heat shield 152 and reaction surface 146 are positioned and aligned in the bladder with vent holes, if any, in the heat shield and reaction surface, appropriately aligned with the vent holes in the bladder.

The inlet conduit 104 is also connected to a nozzle 154 forming part of a gas generator manifold 155 (see FIG. 6). The gas generator manifold 155 also includes a cylindrical main body 156 that receives the fluid outlet portion of the inflation fluid source 112. The cylindrical main body 156 directs the inflation fluid to the nozzle 154. The inflation fluid source 112 is secured to the gas generator manifold 155 in ways well known to those in the art. Moreover, the gas generator manifold 155 and/or the inflation fluid source 112 may include suitable mounting tab structure 158 for attachment to a vehicle proximate the C or D-pillar or to the roof rail. Suitable seals between the inflation fluid source and the cylindrical manifold main body 156 prevent leakage of inflation fluid from the gas generator manifold 155. All of the inflation fluid from the inflation fluid source 112 is therefore confined in the cylindrical manifold main body 156, and is directed through the nozzle 154 and into the inlet conduit 104. Preferably, the cylindrical manifold main body 156 and the nozzle 154 are formed in one piece as a stamped, die cast, etc. metal member (formed e.g. from aluminum) or as machined parts that are welded together. Aluminum is a preferred material, but steel or plastic may also be used. In coupling the nozzle 154 to the inlet conduit 104, a clamp 122 (FIG. 6) would be used to couple these parts together and seal the connection against fluid leakage. Alternatively, the nozzle 154 can extend into the bladder and effectively form the inlet conduit.

When inflation gas is directed into the inlet conduit 104, that gas initially causes the portion of the bladder directly in the path of the inflation fluid to inflate. Moreover, since the reaction surface 146 is directly in the path of the inflation gas, the inflation gas is redirected by the reaction surface in opposite directions relative to the inlet conduit 104. The redirected inflation fluid diffuses into both tapering sections 106A, 106B of the bladder, thereby causing the rest of the tapering sections' bladder to inflate and to distribute the inflation fluid along the cushion 102. The vent holes 138, 140, 142, 143, and 144 (and the openings at the narrow ends of the tapering sections 106A, 106B, if such openings are provided) are located and configured to communicate the inflation fluid to the inflatable sections 102A-G of the cushion, in a manner that causes the inflatable sections of the cushion to inflate in a predetermined sequence that is most appropriate for the particular cushion. For example, with a particular cushion configuration, it may be desirable that certain of the inflatable sections inflate, or begin to inflate, before other sections. The size and location of the vent holes (and the openings at the narrower ends of the tapered sections, if such openings are provided) are designed in accordance with the desired inflation sequence of the inflatable sections 102A-G, and with the diffusion and distribution characteristics of the bladder, so that the desired inflation sequence of the inflatable sections 102A-G is achieved.

In assembling a side curtain air bag according to the foregoing embodiments the bladder, cushion and inlet conduit are initially separately formed and then the bladder and inlet conduit are assembled into the cushion. The cushion is initially formed with the peripheral seams that define the uninflated regions, and also with the internal tethers. The bladder is separately formed by assembling the heat shield and reaction surface with the fabric of the bladder, and sewing the heat shield and reaction surface into the bladder as the bladder is being formed. The tapering sections of the bladder are formed by the sew lines 135, 137 that define the boundaries of the tapering sections. The bladder and cushion have top openings configured so that the bladder is inserted into the top opening in the cushion, and positioned so that its top opening is aligned with the top opening in the cushion, and tabs 139 at the border of the bladder will be located so as to be captured by the perimeter seam 107 that closes up the cushion. Thus, when the perimeter seam 107 closes up the cushion, the bladder is attached to the cushion, and the top opening in the bladder is inside the top opening in the cushion. The hose forming the inlet conduit 104 can be inserted through the top opening in the bladder and clamped to the nozzle of the gas generator manifold when the gas generator manifold is being coupled to the cushion.

If the bladder 106 is woven into the cushion as the cushion is being formed, the seam that borders the uninflated region 116 may form the reaction surface, as described below in connection with FIG. 14. However, as discussed above, the woven cushion and bladder will define a top opening through which a hose forming the inlet conduit can be inserted, when it is desired to couple the cushion to the gas generator manifold nozzle.

After the side curtain air bag is formed, it is folded, placed in a protective sack (which itself can be opened as the air bag begins to inflate) and installed at or near the roof rail of the vehicle. The inflation fluid source 112 is typically secured to the manifold 156, and the nozzle 154 is coupled to the inlet conduit 104 by the clamp 122 prior to assembly in the vehicle. The side curtain air bag with the coupled inflator and the manifold comprise the side curtain air bag assembly 100.

FIGS. 9, 10A-10C, 11, 12A-12B and 13A-13C illustrate alternative structures for redirecting and diffusing inflation fluid in the bladder. In each of those structures, a transverse conduit is formed at the end of the inlet conduit, and redirects inflation fluid in opposite directions into the tapering portions of the bladder, where the inflation fluid is diffused and distributed by the bladder in the manner described above. Specifically, the transverse conduit is disposed in the path of the gas flowing into the bladder through the inlet conduit. The transverse conduit redirects the inflation gas in opposite directions into the tapering sections of the bladder, where it diffuses, and is distributed to the inflatable sections of the cushion 102, in the manner described above.

With the embodiments shown in FIGS. 9, 10A-C and 13A-C, the bladder is formed as one component of the air bag, and the structure forming the inlet and transverse conduit is formed as a separate component that is incorporated into the air bag as a separate component. In the embodiment shown in FIGS. 11, 12A and 12B, the structure that forms the inlet conduit and the transverse conduit is integrally formed with and incorporated into the bladder as the bladder is being formed.

Figure 10A:
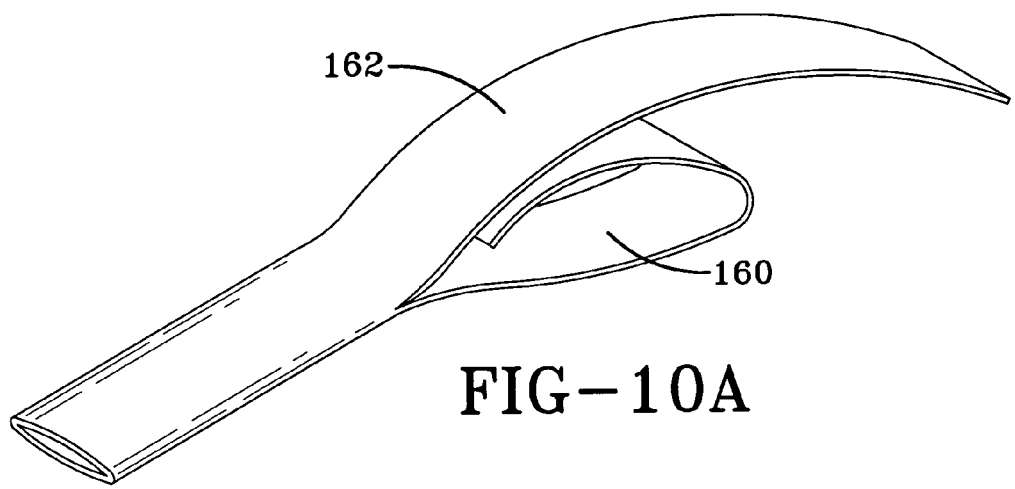
FIGS. 10A-10C illustrate the manner in which the structure of FIG. 9 for redirecting and diffusing inflation fluid can be constructed.
Figure 10B:
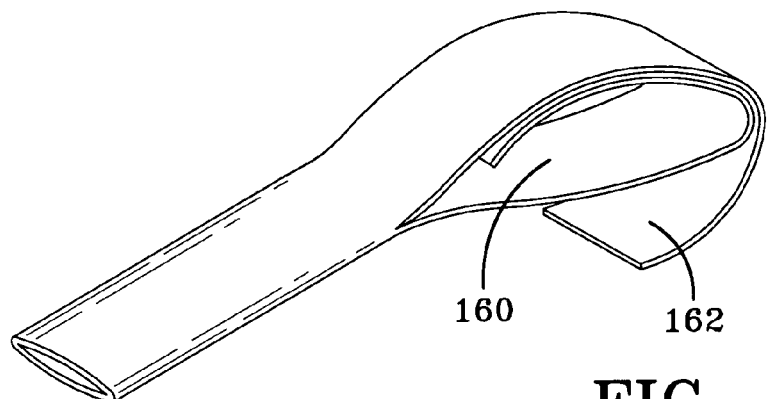
Figure 10C:
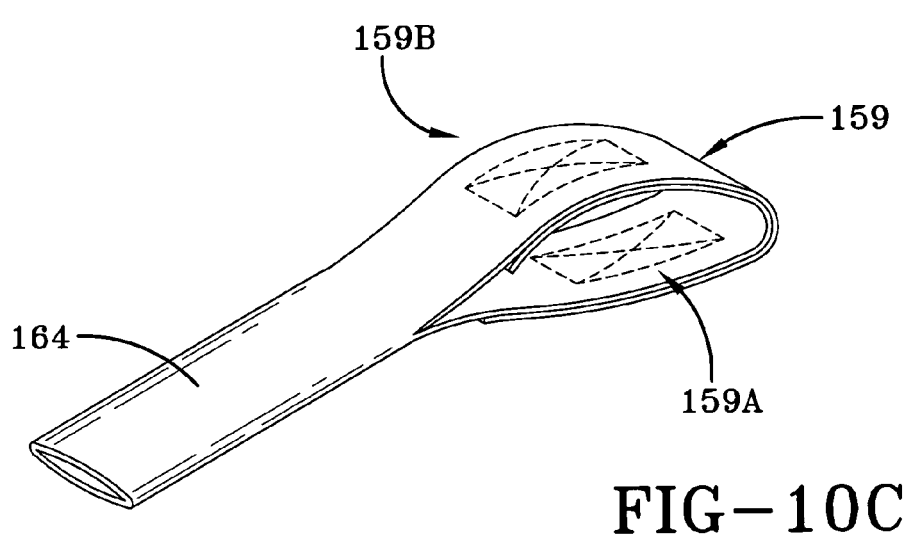

In FIGS. 9, 10A-10C, the transverse conduit 159 is formed by a pair of integral sections 160, 162 of the flexible material that is at the inlet end of a segment of flexible hose that also forms the inlet conduit 164. The section 162 of flexible material is wrapped about the section 160, in the manner illustrated in FIGS. 10A-10C, and the sections 162, 160 sewn to each other, in the manner illustrated, to form the transverse conduit 159. Thus, the transverse and inlet conduit structure is formed as a component separate from the bladder. When the curtain air bag is being assembled, the structure of FIG. 10C is located in the bladder, with the inlet conduit 164 positioned to be clamped to the manifold nozzle, so that inflation fluid is directed into the bladder through the inlet conduit 164.

In the embodiment of FIGS. 10A-10C, the transverse conduit 159 has fluid outlets 159A, 159B at its opposite ends. The fluid outlets 159A, 159B can be reinforced, if desired, before the sections of flexible material 160, 162 are formed into the transverse conduit 159. Forming the flexible material into the two sections 160, 162, and wrapping the sections of flexible material in the manner shown in FIGS. 10A-10C configures the transverse conduit to effectively redirect inflation fluid into the tapering sections of the bladder. In addition, if rather than wrapping the section 162 about the section 160, the distal ends of the sections 160, 162 are placed adjacent to each other and then sewn together to form the sections 160, 162 into the transverse conduit, the transverse conduit is also configured to redirect inflation fluid into the tapering sections of the bladder, but that configuration may not be quite as robust as the embodiment of FIGS. 10A-10C.

Figure 11:
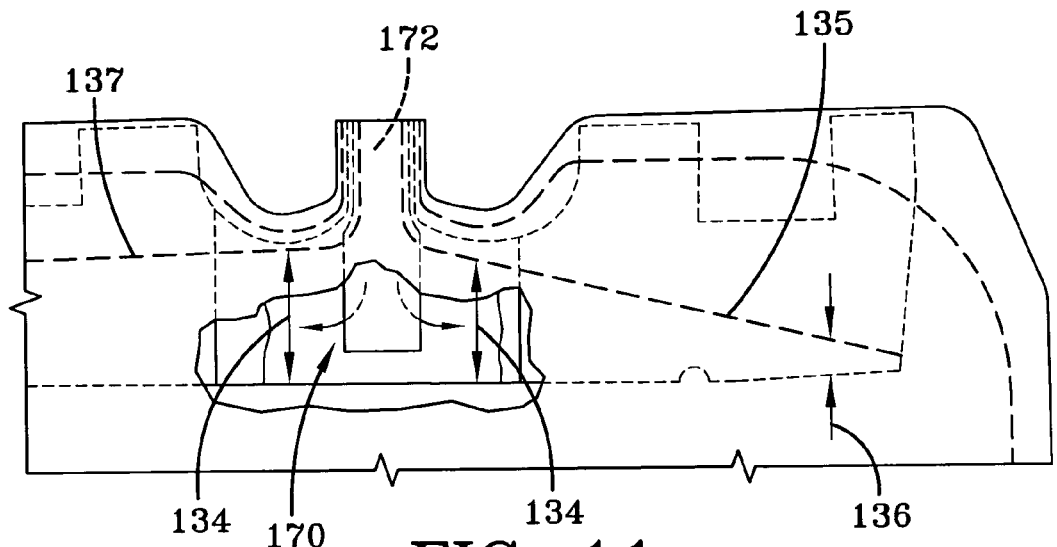
FIG. 11 schematically illustrates another structure for redirecting and diffusing inflation fluid in a side curtain air bag, according to the principles of the present invention.
Figure 12A:
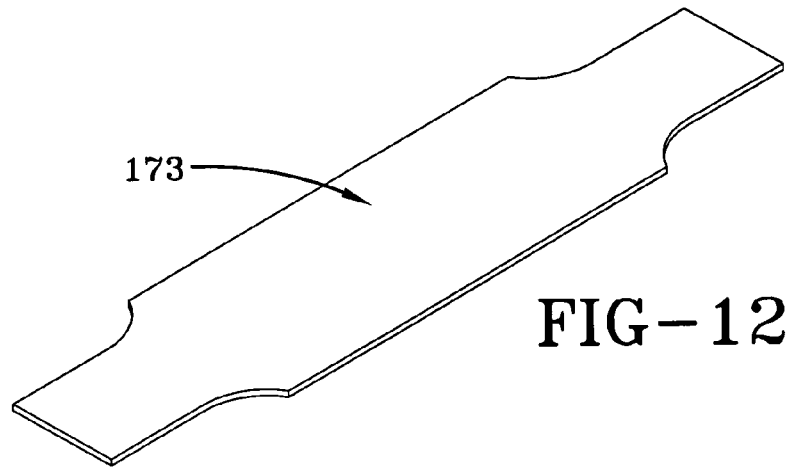
FIGS. 12A and 12B illustrate the manner in which the structure of FIG. 11 for redirecting and diffusing inflation fluid can be constructed.
Figure 12B:
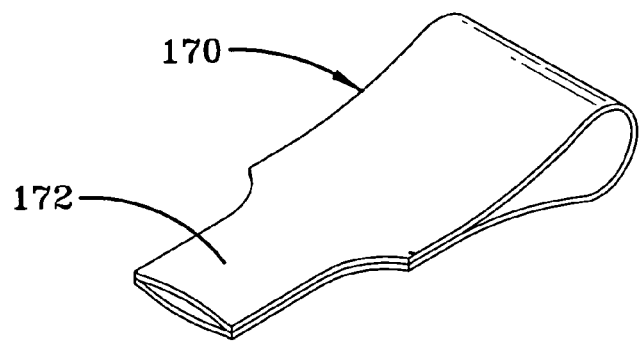

FIGS. 11, 12A, 12B illustrate another way of forming a transverse conduit 170 for directing inflation fluid in opposite directions in the bladder. In the embodiment of FIGS. 11, 12A, 12B, a segment of material 173, such as seat belt material, thin rubber sheet (e.g. EPDM), etc. is formed into the transverse conduit 170, and the remainder of the segment is then sewn into the bladder when the bladder is being sewn into its final configuration, so that the inlet conduit 172 and the transverse conduit are formed in the bladder as an integral part of the formation of the bladder. Thus, the embodiment of FIG. 11, 12A, 12B results in the inlet conduit 172 being sewn into position as the bladder is being formed.

FIGS. 13A-13C illustrate still another way of forming a transverse conduit 180 at the end of an inlet conduit 181. In FIGS. 13A-13C, a segment of flexible hose 182, and a segment of webbing (e.g. seat belt webbing) 184 are provided. The segment of flexible hose 182 is formed into the inlet conduit 181 and has an end formed with a pair of flaps 182A. The segment of webbing 184 is formed into the transverse conduit 180, and has an end formed with a pair of flaps 184A. The segments 182, 184 are aligned so that their respective flaps 182A, 184A overlap, and the flaps are then sewn together to couple and align the inlet conduit 181 with the transverse conduit 180. Thus, the transverse and inlet conduit structure is formed as a component separate from the bladder. When the curtain air bag is being assembled, the structure of FIG. 13C is located in the bladder, with the inlet conduit 181 positioned to be clamped to the manifold nozzle, so that inflation fluid is directed into the bladder through the inlet conduit 181. The transverse conduit 180 is then positioned to redirect inflation fluid in opposite directions in the bladder.

Figure 14:
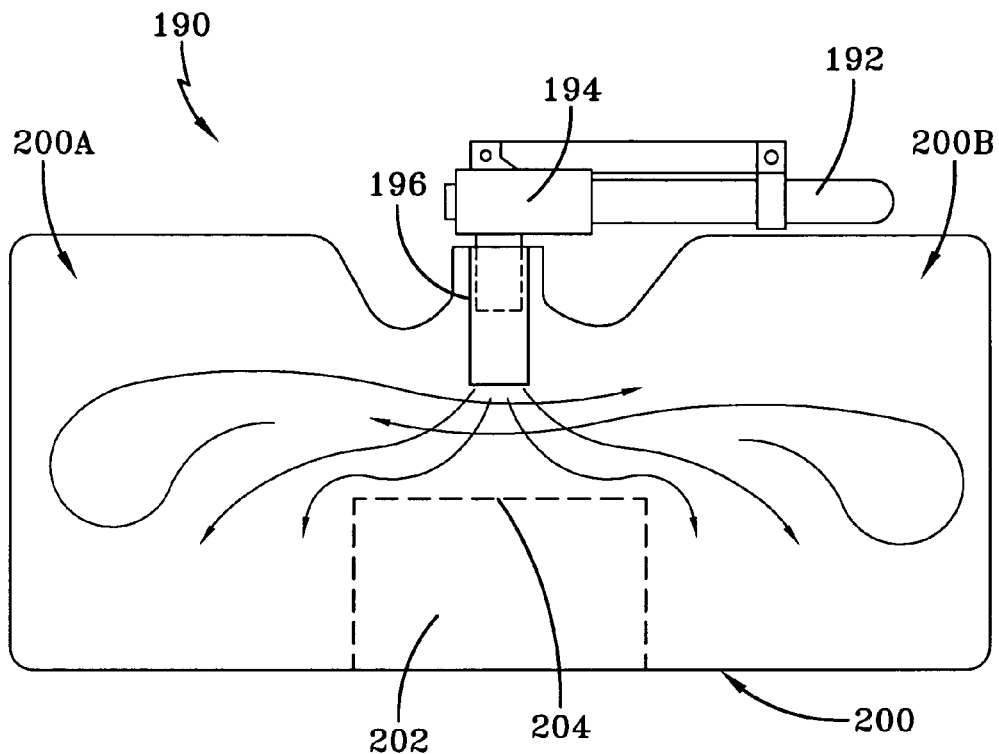
FIG. 14 schematically illustrates another type of side curtain air bag according to the principles of the present invention.

FIG. 14 shows another type of curtain air bag assembly 190 formed according to the principles of the present invention. In FIG. 14, the curtain air bag assembly 190 includes an inflation fluid source 192, manifold 194 and flexible inlet conduit 196 that are similar to FIG. 1. In FIG. 14, an inflatable cushion 200 includes a pair of inflatable chambers 200A, 200B that are similar in size, and are disposed on opposite sides of the inlet conduit 196. An inactive zone 202 is provided between the pair of inflatable chambers 200A, 200B. In FIG. 14, there is no bladder for distributing the inflation fluid. The inlet fluid is redirected by a section of the inflatable cushion disposed along the top seam 204 of the inactive zone, and diffuses into the pair of inflatable chambers 200A, 200B, in the manner schematically illustrated in FIG. 14. If the pressure is greater in one of the inflatable chambers 200A or 200B, the fluid is redirected from that chamber into the other chamber in the manner illustrated, via an active channel that extends between the chambers 200A, 200B. The inflation fluid can flow back and forth between the inflatable chambers 200A, 200B until pressure is equalized in the chambers. Moreover, if the inflation fluid is relatively cool, no reaction surface may be required, and the portion of the cushion along the top seam 204 of the inactive zone is all that is required to redirect the inflation fluid. On the other hand, if the inflation fluid is relatively hot, a reaction surface, and possibly a heat shield, may be required to protect the portions of the inflatable cushion that could be affected by the hot inflation gas.

Figure 15:
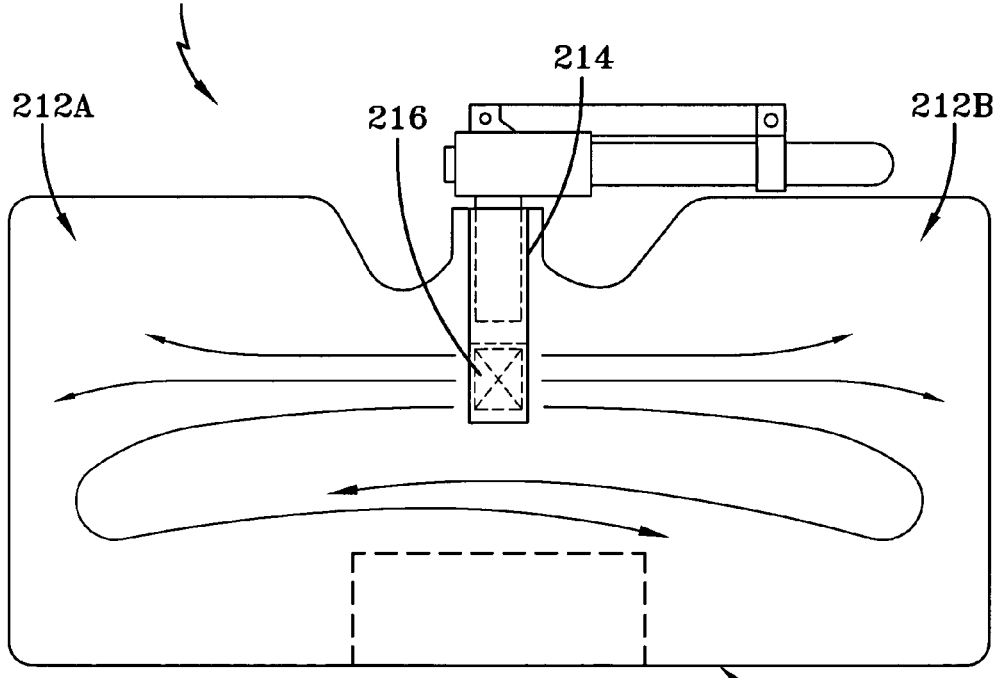
FIG. 15 schematically illustrates an alternative structure for redirecting and diffusing inflation fluid for the type of side curtain air bag of FIG. 14.

FIG. 15 shows a type of side curtain air bag assembly 210 that is generally similar to FIG. 14, in the sense that there is no bladder, and an inflatable cushion 212 has a pair of similar size inflatable chambers 212A, 212B on the opposite sides of an inlet conduit 214. However, as schematically illustrated in FIG. 15, the structure for redirecting the fluid can be a transverse conduit 216 at the end of the inlet conduit 214. The transverse conduit 216 can be configured in the manner described and shown in connection with any of FIGS. 9-13. Otherwise the manner in which fluid is redirected, diffused, and distributed to the pair of inflatable sections is generally similar to that described in connection with FIG. 14. Specifically, if the pressure is greater in one of the inflatable chambers 212A or 212B, the fluid is redirected from that chamber into the other chamber in the manner illustrated, via an active channel that extends between the chambers 212A, 212B. The inflation fluid can flow back and forth between the inflatable chambers 212A, 212B until pressure is equalized in the chambers.

Accordingly, applicants have described above new and useful structures for a curtain air bag, which structures are particularly useful with a mid-mount inflation fluid source. Various changes and modifications in the above-described embodiment of the invention can, of course, be carried out without departing from the scope thereof. Accordingly, that scope is intended to be limited only by the scope of the appended claims.

The invention claimed is:

1. An apparatus comprising:
    a curtain air bag having an inflatable cushion with a plurality of inflatable sections in a predetermined pattern;
    a flexible bladder within the inflatable cushion;
    a fluid inlet conduit configured to direct inflation fluid into the bladder;
    the bladder being configured to redirect, diffuse and distribute the inflation fluid to the inflatable sections of the inflatable cushion, to inflate the portions of the inflatable cushion in a predetermined manner; wherein the bladder is configured to redirect inflation fluid from the inlet conduit in opposite directions relative to the inlet conduit, and to diffuse and distribute the redirected inflation fluid to the inflatable sections of the inflatable cushion;
    wherein the bladder includes (a) a reaction surface for redirecting inflation fluid from the inlet conduit in opposite directions in the bladder, and (b) inflatable, tapering sections configured to diffuse and distribute the redirected fluid to the inflatable sections of the inflatable cushion to inflate the sections of the inflatable cushion in the predetermined manner.

2. The apparatus as defined in claim 1, wherein the reaction surface and the tapering sections of the bladder have a common fold line.

3. The apparatus as defined in claim 2, wherein a heat shield is provided in the bladder, the heat shield also having the common fold line.

4. An apparatus comprising:
    a curtain air bag having an inflatable cushion with a plurality of inflatable sections in a predetermined pattern;
    a flexible bladder within the inflatable cushion;
    a fluid inlet conduit configured to direct inflation fluid into the bladder;
    the bladder being configured to redirect, diffuse and distribute the inflation fluid to the inflatable sections of the inflatable cushion, to inflate the portions of the inflatable cushion in a predetermined manner; wherein the bladder is configured to redirect inflation fluid from the inlet conduit in opposite directions relative to the inlet conduit, and to diffuse and distribute the redirected inflation fluid to the inflatable sections of the inflatable cushion;
    wherein the bladder includes (a) a transverse conduit located at the inlet end of the inlet conduit for redirecting inflation fluid from the inlet conduit in opposite directions in the bladder, and (b) inflatable, tapering sections configured to diffuse and distribute the redirected fluid to the inflatable sections of the inflatable cushion to inflate the sections of the inflatable cushion in the predetermined manner.

5. An apparatus comprising:
    a curtain air bag having an inflatable cushion with a plurality of inflatable sections in a predetermined pattern;
    a flexible bladder within the inflatable cushion;
    a fluid inlet conduit configured to direct inflation fluid into the bladder;
        the bladder being configured to redirect, diffuse and distribute the inflation fluid to the inflatable sections of the inflatable cushion, to inflate the portions of the inflatable cushion in a predetermined manner;
    wherein the bladder comprises a pair of tapering sections, each of which tapers from a relatively wide end to a relatively narrower end, the wide ends of the tapering sections being located to receive redirected fluid and to direct that fluid toward the respective narrower ends.

6. The apparatus as defined in claim 5, wherein the inflatable cushion, the bladder and the inlet conduit are formed as separate components that are configured such that the bladder can be inserted into the inflatable cushion and the inlet conduit can be inserted into the bladder as the curtain air bag is being assembled.

* * * * *